May 16, 1933.  C. S. HAMERSLEY  1,909,672
HANDLING OF FOODS
Filed Feb. 27, 1931   2 Sheets-Sheet 2
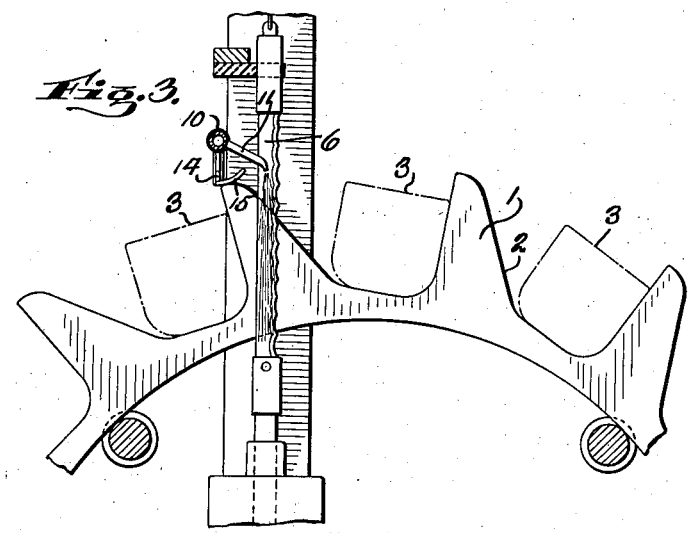
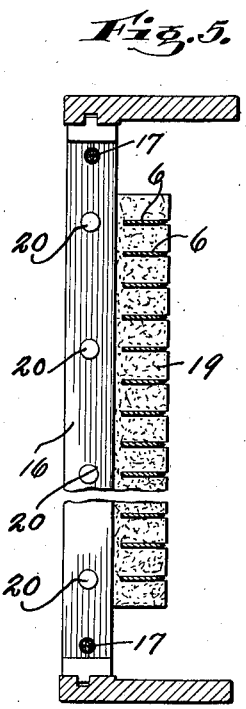
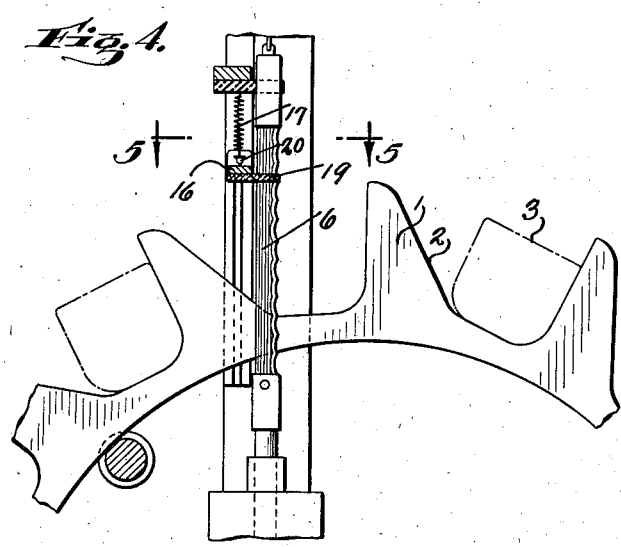
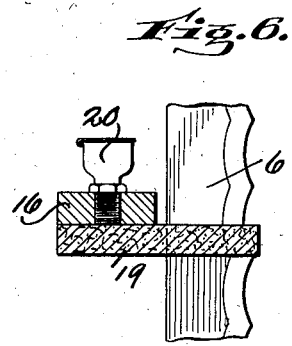
INVENTOR.
CARL S. HAMERSLEY
BY
ATTORNEYS.

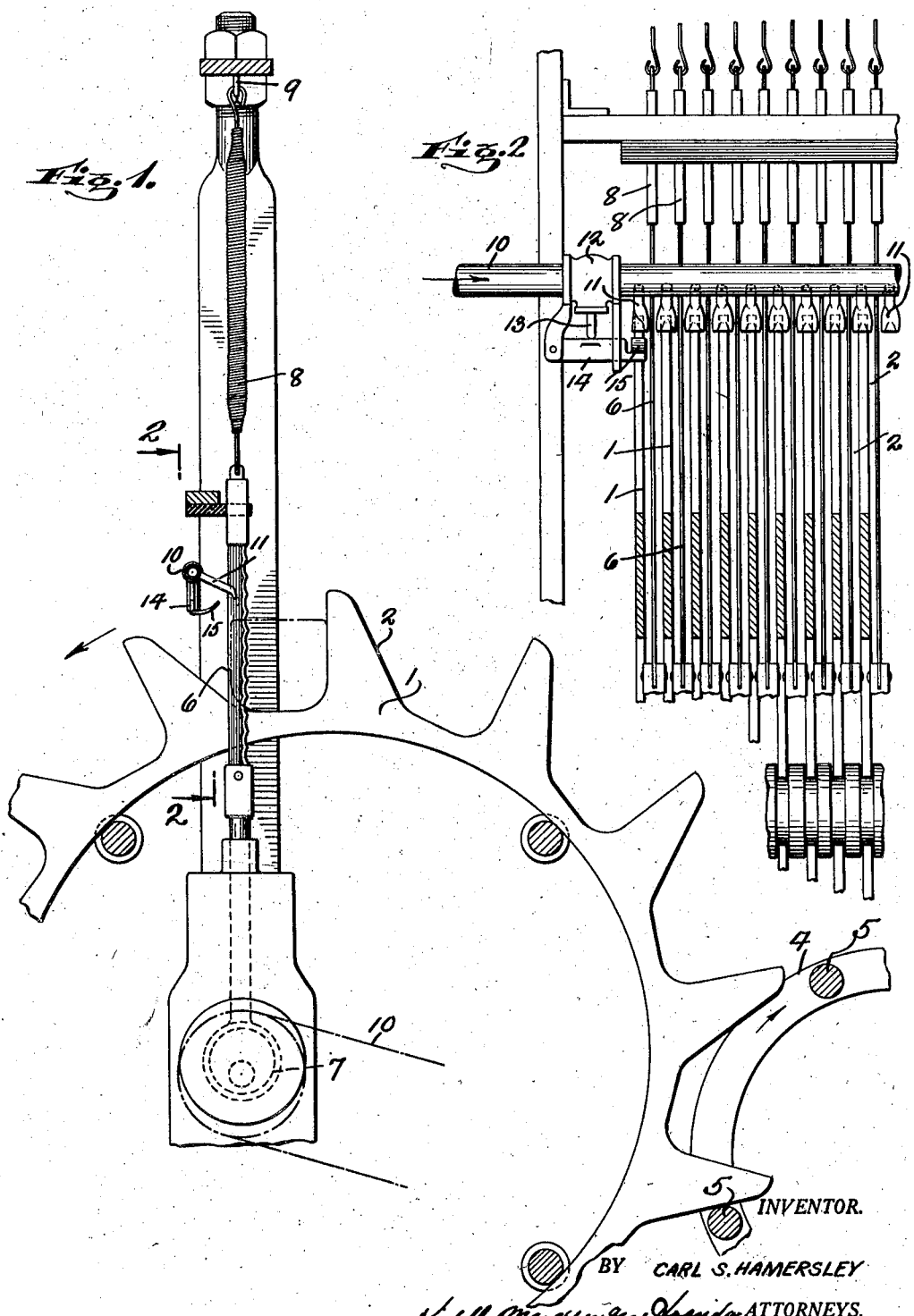
May 16, 1933.  C. S. HAMERSLEY  1,909,672
HANDLING OF FOODS
Filed Feb. 27, 1931  2 Sheets-Sheet 1
INVENTOR.
CARL S. HAMERSLEY
BY
ATTORNEYS.

Patented May 16, 1933

1,909,672

UNITED STATES PATENT OFFICE

CARL S. HAMERSLEY, OF NEW YORK, N. Y.

HANDLING OF FOODS

Application filed February 27, 1931. Serial No. 518,744.

This invention relates to the handling of foods, being particularly directed to the treatment of sliced foods, sliced bread for example, and has for one of its objects the provision of means whereby the growth of mold on such products is retarded and to a large extent prevented and whereby the freshness of the food will be preserved.

In the handling of foods to which this invention is particularly directed the food which is in loaf form is placed in a machine and sliced, means being provided whereby the loaf is properly supported during the slicing operation. This operation is performed by a series of knives or cutters, either reciprocating or rotating, and inasmuch as the knives are exposed to the air they will collect foreign substances deleterious to the loaf to be sliced. The present invention provides for maintaining these cutters in such condition as to destroy such substances, as will be pointed out hereinafter in connection with the detailed description of an apparatus suitable for carrying out my invention.

I have found by many tests and experiments that a loaf of bread sliced in accordance with the present invention will be maintained fresh and free of mold and fermentation much longer than loaves sliced in the ordinary way.

The invention may be carried out in a number of ways but broadly considered the invention is directed to slicing the loaf under conditions which are not deleterious.

In the drawings accompanying this application:

Fig. 1 is an elevational view of a portion of a commercial slicing machine employed in the slicing of breads;

Fig. 2 is a view taken substantially on the line 2—2 of Fig. 1;

Fig. 3 is a view similar to Fig. 1 showing the carriers for the loaf advanced with respect to their position as illustrated in Fig. 1;

Fig. 4 is a modified form of my invention;

Fig. 5 is a section substantially on the line 5—5 of Fig. 4; and

Fig. 6 is an enlarged view of a portion of the apparatus shown in Fig. 4.

Referring to the drawings in detail and first of all to Figs. 1, 2 and 3, 1 designates a series of rotary discs or carriers. Each disc or carrier, as will be seen from the drawings, is provided with pockets 2 for the reception of the loaves to be sliced.

At 3 in Fig. 3 I have shown the outline of loaves of bread in place in these pockets. The discs are rotated by a driving member 4 provided on its face with members 5 arranged in spaced relation and adapted, as will be appreciated, to drive the discs 1 intermittently. The machine illustrated herein is not my invention but is a well known slicing machine in use commercially and for this reason I have deemed it unnecessary to show the same in any great detail.

The machine is provided with vertically extending cutters or knives 6 lying between adjacent discs 1 as is clearly shown in Fig. 2. These knives or cutters are reciprocated through a crank shown at 7 and may be kept under tension by spring 8 attached at the lower end to each knife or cutter, the upper end of each of these springs being anchored to any suitable support as shown at 9. The drive for the cutters or knives may be a chain 10 driven from any suitable source.

As above stated, the loaves 3 are placed in the pockets 2 of the discs and as the discs are rotated these loaves are brought into contact with the edges of the reciprocating cutters or knives 6 so that as the discs continue their rotation the loaf will be sliced and yet be retained in position in the carriers.

In view of the fact that when the loaf is sliced the area of the bread exposed to contamination is very much increased as compared with an unsliced loaf and inasmuch as the knives or cutters 6, in fact all of the apparatus, is in the open air conditions are ripe for contamination of the loaf with the result that the ordinary sliced loaf of bread soon loses its freshness and molds very quickly as compared with an unsliced loaf. I have found that these actions can be very materially reduced by sterilizing the knives or cutters 6. This I may accomplish in a number of ways and so far as the embodiment of my invention shown in Figs. 1, 2 and 3 is concerned and inspection of these figures of the drawings will show that I provide a pipe 10 which extends transversely of the gang of discs or carriers 1. This pipe is supplied adjacent each side of each cutter with a nozzle or discharge spout 11 through which a suitable material such as hydrogen peroxide, for instance, from any suitable source is discharged upon each cutter.

The pipe 10 is provided at 12 with a valve, the stem 13 of which is adapted to be raised intermittently by an arm 14 having a cam 15 adapted to be engaged intermittently by the periphery of the end disc of the disc or carrier gang. Raising of the valve stem opens the valve 12 permitting the material within the pipe 10 to discharge upon the knives or cutters. In this way the knives or cutters 6 are sprayed on their face intermittently with a material which is inhibitory to the growth of bacteria and the knives or cutters 6 maintained sterile at all times.

My invention may also be practiced by use of the apparatus of Figs. 4, 5 and 6. This apparatus is not automatic in the same sense as the apparatus of Figs. 1, 2 and 3. In this embodiment of a suitable apparatus for the practice of my invention I have provided a slide designated 16 which extends crosswise of the gang of discs or carriers 1, this slide being held in its "up" position by springs 17 secured thereto, the upper ends of these springs being anchored to any suitable fixed part of the machine.

On the underside of this slide 16 I provide a pad 19 of felt, for instance, this pad being slotted at intervals to accommodate the knives 6. This provides an arrangement where the pad is in contact with both sides of each knife or cutter 6. I keep this pad saturated with a suitable material which again may be hydrogen peroxide, for instance, this material being supplied to the pad from self-feeding cups 20. In operation, when no loaf is being operated on by the knives the slide 16 is depressed by the hand of the operator and the saturated felt wipes each side of each cutter 6, as will be appreciated, the slide and its attached pad returning to normal position under the action of the springs 17.

From all the foregoing it will be seen that I have provided for sterilizing the knives or cutters 6 and hence eliminated the likelihood of the bread or other loaf being sliced becoming contaminated due to any foreign deleterious material carried upon the surface of the knives or cutters 6. I have shown reciprocating knives but it is to be understood that my invention is equally applicable to rotary knives.

I wish it to be understood also that other means may be employed for maintaining sterile conditions in the slicing operation; for example, the knives or cutters 6 may be sterilized by the application of a flame thereto or they may be subjected to the action of ultraviolet rays.

What I claim is:—

1. Food slicing apparatus comprising in combination a plurality of spaced carriers for the food to be sliced, a slicing cutter or knife at each side of each carrier, and means controlled by one of the carriers for sterilizing each knife.

2. Food slicing apparatus comprising in combination a plurality of spaced carriers for the food to be sliced, a slicing cutter or knife at each side of each carrier, and means intermittently operated by the carriers for applying a sterilizing medium to each knife.

3. Food slicing apparatus comprising in combination a plurality of spaced carriers for the food to be sliced, a slicing cutter or knife at each side of each carrier, and a pad containing a sterilizing medium mounted for manual reciprocation in contact with each knife to apply the sterilizing medium thereto.

4. Food slicing apparatus comprising in combination a plurality of spaced rotary food carriers, a slicing knife or cutter at each side of each carrier, a conduit for a sterilizing medium extending adjacent said cutters, discharge spouts for the conduit adjacent each cutter, and valve mechanism for the conduit controlled by one of said carriers for intermittently effecting a discharge of the sterilizing medium upon said knives.

This specification signed this 26th day of February, 1931.

CARL S. HAMERSLEY.